United States Patent [19]
Stockman et al.

[11] Patent Number: 5,778,392
[45] Date of Patent: Jul. 7, 1998

[54] OPPORTUNISTIC TILE-PULLING, VACANCY-FILLING METHOD AND APPARATUS FOR FILE-STRUCTURE REORGANIZATION

[75] Inventors: Steven Stockman, Los Angeles; John Blackburn, Manhattan Beach, both of Calif.

[73] Assignee: Symantec Corporation, Cupertino, Calif.

[21] Appl. No.: 626,673

[22] Filed: Apr. 1, 1996

[51] Int. Cl.$^6$ .................................................. G06F 17/30
[52] U.S. Cl. ................................... 707/205; 707/200
[58] Field of Search .................................. 395/616, 617, 395/618, 619, 620, 621, 622, 750, 800; 707/200, 201, 202, 203, 204, 205, 206

[56] References Cited

U.S. PATENT DOCUMENTS

| | | | |
|---|---|---|---|
| 5,463,776 | 10/1995 | Voigt et al. | 395/621 |
| 5,481,702 | 1/1996 | Takahashi | 395/621 |
| 5,561,785 | 10/1996 | Blandy et al. | 395/622 |
| 5,561,786 | 10/1996 | Morse | 395/621 |
| 5,574,907 | 11/1996 | Jernigan, IV et al. | 395/601 |
| 5,604,902 | 2/1997 | Burkes et al. | 395/622 |
| 5,623,654 | 4/1997 | Peterman | 395/622 |

OTHER PUBLICATIONS

'Parallel Algorithms For Optimal Data Allocation in a Dynamic CIM Network' 15–18 Jun. 1992 Remedios, I.; Efe, K., Delcambre, L.

'Distribution and Persistence in Multiple and Heterogeneous Address Spaces' Ferreira, P.; Shapiro, M. 9–10 Dec. 1993.

*Primary Examiner*—Thomas G. Black
*Assistant Examiner*—Ruay Lian Ho
*Attorney, Agent, or Firm*—Fliesler, Dubb, Meyer & Lovejoy

[57] ABSTRACT

A storage reorganizing system subdivides a reorganizable storage space into tile areas. Each tile area either contains file data or does not contain file data. The data in a tile area that contains file data is referred to as a tile. A tile area that does not contain file data is referred to as a vacancy. Tiles that are not yet located in their goal positions, as defined by a recorded goal state definition, are opportunistically moved to available vacancies that are the goal positions for such tiles as the vacancies become available. Each tile move leaves behind it a new vacancy. The speed of opportunistic tile moving is optimized by first locating the largest vacancies that are each to be filled with the largest amount of tile data and by first moving tiles to such vacancies. One goal state produces a defragmented set of files. Another goal state produces an intentionally fragmented set of files. A third goal state produces a set of files that are fragmented and whose fragments are tightly interleaved on an access-wise basis so as to enable quick switching between a fragment of a first file and a fragment of a second file.

56 Claims, 5 Drawing Sheets

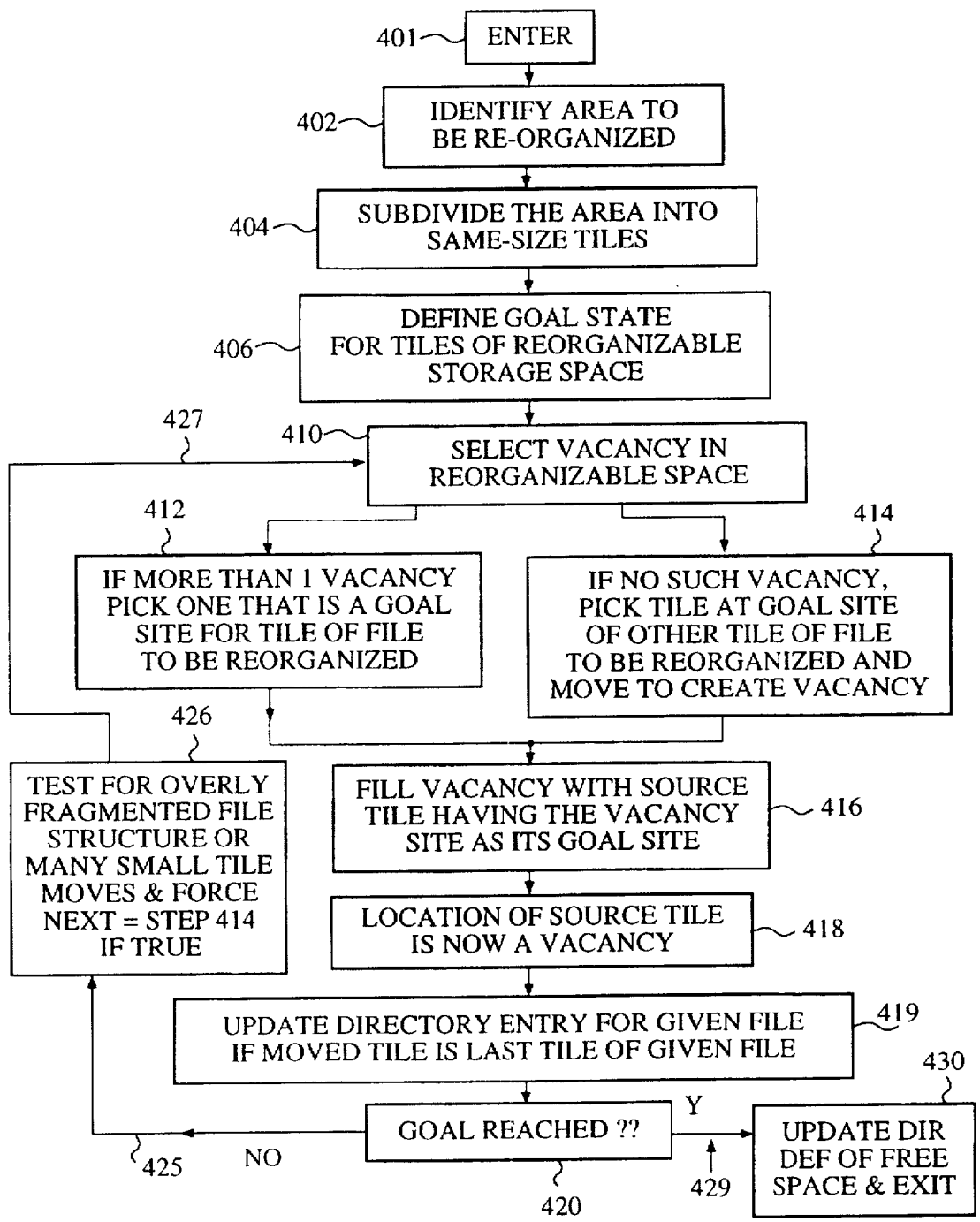

OPPORTUNISTIC TILE-PULLING, VACANCY-FILLING METHOD AND APPARATUS FOR FILE-STRUCTURE REORGANIZATION

BACKGROUND

1. Field of the Invention

The invention relates generally to the storage organization of digital data files that are stored on random access storage devices such as magnetic disk, writable-optical disk, and the like.

The invention relates more specifically to methods for reorganizing the storage arrangement of data files stored on a random access storage device (RASD) for purposes such as disk performance optimization and file defragmentation.

2. Description of the Related Art

Data storage space in random access storage devices (RASD's) such as magnetic disk, optical disk, flash EEPROM and the like, is typically subdivided into discrete storage sub-areas. The storage sub-areas of a magnetic disk or of another kind of RASD are referred to in the industry by many different names including: 'clusters', 'allocation blocks', and 'sectors'. Typically, a cluster or an allocation block will contain a predefined plurality of sectors.

Each storage sub-area has a respective, predefined storage capacity that is smaller than the overall data storage capacity of the RASD.

Data files are usually recorded on RASD's by using specific ones of the storage sub-areas (e.g., allocation blocks) as elementary construction blocks. The operating system software (OS) generally allocates an integral number of 'free' storage sub-areas for forming each new data file and the OS typically also defines a logical interrelation between the allocated sub-areas, such as whose contained data is first within a respective file and whose contained data is last within that same file.

The data of a pre-recorded data file is accessed by identifying the storage sub-areas that have been assigned to that data file and reading from, or writing to, the identified storage sub-areas as appropriate.

Quite often, the logical linking sequence or other logical organization of the data of a given file plays as important a role in defining the given file as do the specific identities of the storage sub-areas that contain the file's data.

By way of example, consider a file whose data represents a letter to a friend where the stored version of the letter has three parts: a heading portion stored in a first storage sub-area; a body portion stored in a second storage sub-area; and a closing portion stored in a third storage sub-area. In such a case, proper recreation of the letter generally calls for accessing the data of the respective first through third storage sub-areas in the recited order. To do so, one generally needs to know both the identity of the first through third storage sub-areas and the order in which they are logically linked.

Independent of logical linking, the storage sub-areas (e.g., 'sectors') of a given random access storage device (RASD) may be distributed physically about the storage device in many different ways. The different ways include, but are not limited to: (1) the sub-areas being provided on each of a series of concentric rings, such as is conventionally done on the tracks of magnetic disks; and (2) the storage sub-areas being provided sequentially along a spirally wound path, such as is conventionally done on compact optical disks (CD or CD-ROM platters).

The physical arrangement of storage sub-areas in the storage medium does not necessarily correlate one-for one with sequence in which they are normally accessed. Techniques such as sector interleaving may be employed to improve access speed. So physically adjacent sectors may not be normally accessed one after the next. Instead, a sector interleave or other order may be defined and routinely followed by the read/write head or other data access means of the random access storage device (RASD) as it sequences through the storage sub-areas in order to read or write data to multiple sectors or other sub-areas as quickly as possible.

Sectors or other sub-areas that are accessed in sequence according to this normal sequencing are referred to herein as being 'access-wise adjacent'.

The data of a given file is not necessarily stored in accordance with the normal sequencing order of the RASD's data access means. Instead, part of the file's data may be stored in a few sectors in one track and the remainder may be scattered across other sectors of randomly spaced away other tracks. The access-wise, spaced apart fragments of such a 'fragmented' file are referred to herein as being 'access-wise non-adjacent'. (Similarly, groups of 'tiles' or groups of 'vacancies' {defined below} wherein each member of the group is access-wise disjoint from other members of the same group of tiles or vacancies are referred to herein as being access-wise non-adjacent. On the other hand, pluralities of tiles or pluralities of vacancies that are accessible in substantially minimal time by way of the RASD's normal access sequencing operations are referred to herein as being 'access-wise adjacent'.)

In accessing a specified portion of a file for purposes of reading data from and/or writing data to that file portion, it is often necessary to identify the specific physical location of the one or more corresponding storage sub-areas either directly (e.g., by surface, track, and sector numbers) or indirectly (e.g., by way of a lookup table). Signals representing the identified physical locations are then provided to a data accessing means such as the read/write head actuator of a magnetic disk drive and the read/write head is moved to that physical location. (If the RASD is an EEPROM or a magnetic bubble memory, the storage sub-area identifying signals can be simply address signals that point to the start of a desired sub-area.)

A pre-specified portion of the random access storage device is normally set aside for storing data structure information that identifies the specific sub-areas that form each data file and that indicates the logical linking sequence or other logical organization for the data of those file-forming sub-areas. This set-aside portion is often referred to as the 'directory structure'.

The directory structure may include one or more data structures of its own that are generally referred to in the industry as: a volume catalog, a catalog extension structure, and a file allocation table (FAT). Different names and slightly different functions may be assigned to each of the file-defining data-structures in the directory structure depending on the one or more specific 'file structures' that are used by a given random access storage device and its corresponding, software-defined disk-operating system (DOS).

For purpose of example, assume that the RASD in question is a multi-platter magnetic hard disk system (a Winchester-type disk drive) and that the disk system has fixed-size sectors organized as concentric rings distributed between the inner and outer operative diameters on each major surface of each of its platters. Such rings are typically referred to as 'tracks'. The vertically overlapping tracks of vertically overlapping platters define a 'cylinder'.

The exemplary magnetic disk typically includes a file allocation table (FAT) that identifies which of the allocation blocks are free from defect (which are 'good') such that they may be safely used for data storage. The FAT will typically also indicate which of the defect-free 'good' allocation blocks are presently free or available for storing newly-introduced data. Allocation blocks that store data of an existing file are designated as not-free.

Each free allocation block that is allocated for storing newly-introduced data is logically removed from a 'free list' and is used for storing a next quantum of newly-introduced data not exceeding the maximum storage capacity of that allocation block.

Because each allocation block can store a maximum amount of data such as 1024 bytes (1K) or 2048 bytes (2K) per allocation block, when a file is created for storing more than one-allocation block's worth of data, the file's data is subdivided and distributed across a plurality of allocation blocks.

A volume catalog is established on the disk system for associating a 'file_name' (and/or 'file number') with the stored data of the file. The volume catalog is also used for storing 'file_start' pointer data such as platter-surface, track, and sector numbers that point to the physical location on the RASD at which the file starts. The volume catalog also usually stores 'file_size' data for indicating the size of the file in terms of the number of bytes that the particular file contains. The volume catalog may additionally or alternatively store 'file_end' data for indicating where the file's data ends.

When a disk (or other RASD) is relatively new, either at the start of the disk's operating life or just after it has been re-formatted, the disk has many sections of access-wise adjacent and 'free' sectors available for receiving and contiguously storing the data of large files. The resulting file structures for an initial set of recordings tend to be access-wise contiguous or whole. Each newly added file contiguously follows the previously added, and contiguous file.

However, as the disk begins to fill up, and as old files are deleted and newer files are added, and/or as pre-existing files are modified many times over, the stored files on the disk tend to become 'fragmented'.

The term, 'fragmented' is used herein to describe the condition in which the data of a specific file is no longer entirely stored along an access-wise sequential series of discrete storage sub-areas (e.g., allocation blocks). Rather, the data of a fragmented file is scattered about the random access storage device in a more random, spaced apart fashion.

When a file is fragmented, it may be necessary to perform multiple seeks to widely spaced-apart sections of the disk (e.g., jumps between nonadjacent tracks) in order to access desired parts of that file. This may disadvantageously increase file access time. Accordingly, file fragmentation is generally undesirable.

When file fragmentation begins to occur, additional information is usually added to the directory structure of the disk to indicate where the various fragments of each file are located. This additional information is often stored in a structure referred to as the 'volume catalog extension'. The volume catalog extension or its equivalent is used to logically tie together the fragmented portions of each so-splintered file. The volume catalog extension structure is sometimes alternatively referred to as the 'extents tree'.

Each time a previously-stored file is retrieved from the random access storage device, the disk-operating system typically first consults the corresponding volume catalog to determine if the data of the named file physically resides on the storage device and if so, where it resides. If the file is fragmented, the extents tree may also have to be consulted to locate the various fragments of the file.

Due to a variety of reasons, files on a given disk have a tendency to break up over time and to become fragmented. This phenomenon is commonly referred to as 'file fragmentation' or 'disk fragmentation'. As more and more files on a given disk (or other RASD) become progressively more fragmented, file retrieval time tends to become longer due to delays associated with having to skip about between physically or logically non-sequential and disparate portions of the recording medium.

So-called 'disk optimizers' have been developed for defragmenting the files of magnetic disks. The general algorithm for conventional defragmentation (referred to herein as the conventional 'push-pull' algorithm) is as follows:

(1) Create a list of successive file names, each with an associated file storage size, and point to the first file name in the list.

(2) Point to the beginning of the disk's file storage space.

(3) Move (or 'push-out-of-the-way') one or more files occupying the space starting at the currently pointed-to disk position to disk free space so as to create a continuous vacancy beginning at the currently pointed-to disk position. The created vacancy must be at least sufficiently large to store the data of the currently pointed-to file in the file names list. Each file push-out-of-the-way step is accompanied by an update to the disk directory that indicates the new location of the just pushed file.

(4) Move (or 'pull') the file whose name is currently pointed-to in the file names list from that file's old position into the newly created vacancy and update the directory accordingly.

(5) Change the current disk position pointer to point to the next physically adjacent and usable position after the end of the just moved (just pulled) file.

(6) Advance the list pointer to point to the next file name in the file names list.

(7) Repeat steps (3) through (6) until the list of file names is exhausted.

The above-described, conventional push-pull approach suffers from the disadvantage that some files may be pushed around multiple times before they are pulled into their final resting place.

Each unnecessary, additional push of a file's data disadvantageously increases wear and tear on the disk drive mechanism and sometimes even on the recording medium itself. Each unnecessary, additional data move disadvantageously consumes system time and resources. There is a danger with each file move that the moved data may be corrupted or that the associated directory structure may be corrupted. Basically, each nonessential modification to the stored data on the disk (or other RASD) adds to the probability of imminent or subsequent data corruption and to like probability of directory corruption.

Accordingly, an alternative method that reduces the number of nonessential modifications to the stored data of a magnetic disk or of another type of RASD (random access storage device) during file defragmentation would be beneficial.

Aside from the problems that come with the fragmentation of individual files (hereafter, intra-file fragmentation) there is another kind of disadvantageous reorganization (hereafter, inter-file fragmentation) that may occur over time with respect to multiple files.

Suppose there is a set of files that are accessed substantially simultaneously by a given application program. The application program may need to jump rapidly between the stored data of these files within a limited time window. If these jointly-used files wander away from each other on the storage space of the disk, over time, as a result of repeated file rewrites, the performance speed of the given application program may suffer due to increased latency in switching from a first part of a first of these files to a second part of a second of these jointly-used files.

The conventional push-pull algorithm can alleviate this inter-file fragmentation problem to some extent, —if the jointly-used files are optimally positioned next to each other on the files name list. However, closely used first and second parts of respective first and second jointly-used files may still be far apart from one another in terms of switching latency because the conventional push-pull algorithm always stores files each as an integral whole.

It may be advantageous in certain instances to intentionally fragment two or more jointly-used files and to closely interleave specific fragments of these files within the storage space.

A file re-structuring method that provides users with a wide spectrum of choices including allowing them to selectively choose between the extremes of intra-file defragmentation and intentional inter-file fragment interleaving would be beneficial.

SUMMARY OF THE INVENTION

The above-mentioned problems are overcome and the above-mentioned benefits are provided in accordance with the invention by providing a goal-oriented, opportunistic tile-pulling, vacancy-filling method and a corresponding apparatus for reorganizing the file structure of a magnetic disk or of other kinds of RASD's (random access storage devices).

An opportunistic tile-pulling, vacancy-filling method in accordance with the invention generally performs a fewer number of data moves than does the corresponding, conventional 'push-pull' algorithm.

An opportunistic tile-pulling, vacancy-filling method in accordance with the invention can be most quickly explained by analogizing a portion of it to a well-known tile shuffle game.

In the tile shuffle game, a tile-supporting plane (e.g., a game board) is arranged to hold a four-by-four matrix (4×4) of square tiles but it only supports fifteen (15) such tiles, thus leaving one vacancy. The tiles are numbered on their tops as one (1) through fifteen (15) and are provided in scrambled order. The object of the game is to slide the tiles either within the 4×4 matrix boundaries of the game plane until the tiles display a logical sequence of the numbers one (1) through fifteen (15). Tile sliding is limited to moving one of four tiles that neighbor the vacant spot either horizontally or vertically (but not diagonally) into the vacant spot. The moved tile creates a new vacancy.

Implicit in the above-described tile shuffle game is that the player has a predefined mental notion of what the desired final resting position is for each tile.

Consider now that the files of a random access storage device are each subdivided according to their respective storage sub-areas and the data of each storage sub-area (e.g., allocation block or sector) that contains file data is considered a tile. The object is to move tiles about until a desired pattern of tiles is achieved. Each tile move is deemed to leave behind it, a logical vacancy (because the source storage location no longer needs to maintain the moved data).

In the context of the invention, however, tile moves are not limited to horizontal or vertical slides in a plane. Any tile can be moved from its current position directly to any logical vacancy. There can be more than one vacancy at any given time. And more than one tile of data may be moved at a given time from a corresponding set of source locations to a corresponding set of destination vacancies.

The moved tiles are preferably all the same-size to simplify keeping track of them, although this is not necessary. Also, the tiles do not have to be each as small in size as the elemental storage sub-area of the random access storage device. In accordance with the invention, a tile can be defined by the data of a plurality of logically adjacent storage sub-areas rather than the data of just one sub-area.

A method in accordance with the invention accordingly comprises the steps of:

(a) identifying one or more files or groups of files that are to be reorganized, the identified files or file groups residing in a re-organizable storage space;

(b) subdividing the data of the re-organizable storage space into tiles, each tile corresponding to one or more logically adjacent storage sub-areas (e.g., those sub-areas that are sequentially accessible according to the normal sector interleaving or other normal accessing sequence of the read/write head or other data accessing means);

(c) before making associated tile moves, defining and recording as a machine-readable goal state, the desired final resting position of each tile in the re-organizable storage space;

(d) identifying an already existing vacancy space within the re-organizable storage space, and if none; creating at least one such vacancy space within the re-organizable storage space;

(e) moving (pulling) into the pre-existing or created vacancy space the data of a source tile that has the current vacancy space defined by the recorded goal state as the final resting position for that source tile;

(f) upon completion of a move of a last source tile of a given source file to its destination as defined by the goal state, updating the directory to reflect the new organization of the re-organized file;

(g) repeating method steps (d), (e) and (f) until the goal state is achieved; and (h) upon completion of the move of the last source tile to its destination as defined by the goal state, updating the directory to reflect consequential changes to free space within the re-organizable storage space as a result of the completed tile moves.

As seen in the above method, each tile pull creates a new vacancy that may, in general, be opportunistically filled by yet another tile-pull.

In most instances, the above opportunistic vacancy-fill method (OVF method) produces no more than one move for each tile portion of each identified file, the move being from the tile's original position to its goal position.

On occasion, if there are no opportunistically fillable vacancies available, it may be necessary to 'therapeutically' push one or a few tiles to positions other than its/their goal resting positions in order to initiate or rekindle the opportunistic vacancy-fill (OVF) process. An example of such a deadlock condition is where two tiles occupy each others goal resting positions. Another example is where a larger plurality of N tiles occupy each others goal resting positions in round-robin fashion.

It can be seen from the above, that in general, the opportunistic vacancy-fill (OVF) method uses a smaller number of data moves than does the conventional push-pull method. This reduces wear and tear on the disk drive mechanism and/or reduces wear and tear on the recording medium, and/or minimizes the total time required for reorganizing data structures, and/or minimizes the number of updates to the directory structure.

The above step (c) of defining and recording a machine-readable goal state and thereafter automatically realizing the goal state with a substantially minimal number of moves for most tiles, allows for a wide variety of useful possibilities.

In one embodiment, the goal state constitutes a defragmented organization of the data of each identified file on an intra-file basis. The data of each file is accordingly re-organized into a logically continuous sequence of access-wise adjacent storage sub-areas as it is in traditional file defragmentation, with the caveat that each re-organized segment of data is generally moved only once across the storage space of the RASD rather than being pushed around many times before settling into its final position.

In a second embodiment, the goal state is defined as a highly fragmented organization of the data of the identified files. Each resulting file is a logically discontinuous entity. The latter state is useful for testing the speed of file-accessing application programs under worst state conditions. The highly-fragmented goal state is a diametric opposite to that attained by traditional file defragmentation. It provides a useful tool for software developers whereby they can test the real-time performance of their programs and isolate bottlenecks within the data flow of their programs by subjecting those programs to goal state defined, worst-case scenarios of file organization.

In yet another embodiment, the goal state is defined so as to intentionally fragment a predefined set of jointly-used files and so as to closely interleave specific fragments of these files in the re-organizable storage space. The close interleaving of the specific fragments is arranged so as to achieve shorter switching time between the interleaved fragments of the jointly-used files when accessed by a corresponding application program. The interleaving arrangement that is to be followed for the interleaved file fragments will vary on a case by case basis in accordance with the switching sequence called for by the corresponding application program. The result is that, although each of the jointly-used files is itself fragmented, the interleaved collection of the jointly-used files nonetheless defines a substantially continuous whole whose respective fragments are more quickly accessible to the application program for which the interleaving arrangement was defined.

A system for carrying out data structure reorganization in accordance with the invention comprises: (a) primary storage for storing a plurality of files in a file storage space in accordance with a first file storage organization, where the first file storage organization may be represented as a first mapping of tiles of data each in a corresponding tile space of the file storage space; and (b) file storage reorganizing means, operatively coupled to the primary storage, for reorganizing the storage organization of the primary storage such that one or more of the files are stored after the reorganization in the primary storage in accordance with a second file storage organization that is different from said first file storage organization, where the second file storage organization may be represented as a second mapping of the tiles of data each in a corresponding tile space; and where the file storage reorganizing means includes (b.1) opportunistic vacancy-fill means having (b.1a) vacancy locating means for searching through the file storage space of the primary storage looking for a to-be-filled vacant tile space that is to be ultimately occupied according to the second mapping by a corresponding tile of data and further having (b.1b) tile moving means, operatively coupled to the vacancy locating means, for moving, in response to the finding of said to-be-filled vacant tile space, the corresponding tile of data from its currently occupied storage space to the found vacant space.

An instructing apparatus in accordance with the invention is provided for operatively coupling to a target computer and for causing the target computer to carry out reorganization of data stored in a storage space of the computer, where the stored data is arranged prior to reorganization according to a first storage organization, where the first storage organization may be represented as a first mapping of tiles of data each in a corresponding tile space of the storage space; where the instructing apparatus comprises: (a) goal tile mapping means for defining a goal mapping of tiles containing data onto tile spaces of the storage space; (b) search means for causing the target computer to search through the storage space looking for a to-be-filled vacant space that is to be ultimately occupied according to the goal mapping by a corresponding tile of data; and (c) move means for causing the target computer to move, in response to the finding of said to-be-filled vacant space, the corresponding tile of data from its currently occupied tile space to the found, to-be-filled vacant tile space.

Other aspects of the invention will become apparent from the below-detailed description.

BRIEF DESCRIPTION OF THE DRAWINGS

The below detailed description makes reference to the accompanying drawings, in which:

FIG. 4 is a flow chart showing one machine-implemented method for carrying out a tile-pull and vacancy-fill reorganization in accordance with the invention.

DETAILED DESCRIPTION

Figure 1:
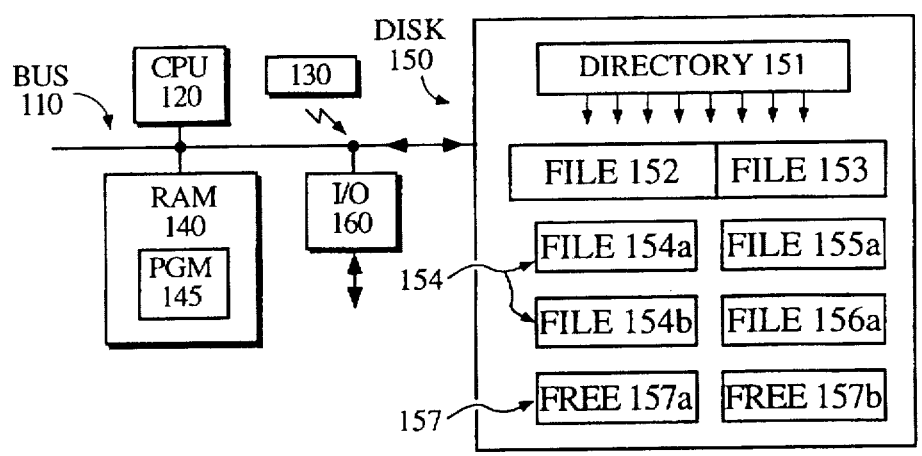
FIG. 1 is a block diagram of a computer system that may be operated in accordance with the invention.

FIG. 1 diagrams a computer system 100 that may be used in accordance with the invention.

Computer system 100 includes a system bus 110 coupling a high-speed system memory 140 such as a random access memory (RAM) to a plurality of other system resources including a system data processing unit (CPU) 120, a nonvolatile primary voluminous-data storage subsystem (disk) 150, a system I/O module 160, and a removably couplable secondary data conveying means 130 which latter means may be defined by a diskette drive with an installed but easily removable and replaceable magnetic or optical diskette.

The system memory 140 may be comprised of assorted types of high-speed random access devices into which immediately executable code may be stored. System memory 140 can include one or more of static random access memory (SRAM), dynamic random access memory (DRAM), and other like devices. Typically at least part of the system memory 140 is volatile, meaning data is lost and must be rewritten when power is lost. It is not outside the contemplation of the invention, however, to have system memory 140 defined by non-volatile random access memory devices such as flash EEPROM.

Often the computer system 100 will include a small boot ROM (read-only memory, not shown) coupled to the CPU 120 for power-up and other re-bootings of the system.

When system 100 boots-up, an attempt is made to automatically load various files from the primary disk (primary storage) subsystem 150 or from elsewhere (e.g., from system I/O module 160 or from the secondary data conveying means 130) into system memory 140 to thereby create executable code and other useful data structures within system memory 140. The illustrated RAM-resident program, PGM 145 is an example. The executable code and/or other data structures 145 normally include system-executable instruction code that can be immediately executed by a responsive data processing unit such as the illustrated central processing unit (CPU) 120 of FIG. 1 or by non-centralized multiple data processing units (not shown) that may be further or alternatively coupled to bus 110.

The system I/O module 160 uses bus 110 for transferring data between one or more of the illustrated portions of system 100 and external devices. In one embodiment, the system I/O module 160 may couple the illustrated system 100 to a local area network (LAN) or to a wide area network (WAN) or to other external data transceiving and processing means (e.g., a cable headend or a space satellite system).

The primary storage subsystem 150 may include a mechanical or other type of drive (not separately shown) and a data storage medium (not separately shown) into which voluminous amounts of data (e.g., hundreds of megabytes) may be stored and from which data may be retrieved. The data storage medium of primary storage subsystem 150 may be in the form of a magnetic hard disk, or a re-writable optical disk, or other such non-volatile, randomly accessible, readable and writable media. ROM or Flash EEPROM or magnetic bubble memory may be alternatively used in carrying out some or all of the nonvolatile voluminous data storing functions of the primary storage subsystem 150.

Data is recorded on the primary storage subsystem 150 to define a directory structure 151 and a plurality of files (not all shown). Down-pointing arrow-headed lines are drawn emanating from the bottom of area 151 to indicate that directory structure 151 points the way to the start and subsequent portions of the RASD-internal files.

A first such file 152 is shown to have all of its data recorded in logically sequential order across logically successive storage sub-areas of a corresponding first storage area that is also designated as 152. (The specific sub-areas are not shown in FIG. 1.)

A second file 153 is similarly shown to have all of its data recorded in logically sequential order across logically successive storage sub-areas of a corresponding second storage area that is also designated as 153. The second storage area 153 is immediately adjacent to the first storage area 152. Each of the first and second files, 151 and 153, is not fragmented.

A fragmented, third file 154 is illustrated as having part of its data recorded in successive storage sub-areas of a third storage area that is designated as 154a and another part of its data recorded in successive storage sub-areas of a fourth storage area that is designated as 154b. The third and fourth storage areas, 154a and 154b, are not immediately or logically adjacent to one another.

By way of further example, fragmented portions 155a and 156a of respective fourth and fifth files, 155 and 156, are shown to be physically positioned near the third and fourth storage areas, 154a and 154b.

Physical discontinuity is not a pre-requisite for considering a file to be fragmented. It is merely used in FIG. 1 as a convenient illustrative gimmick for indicating the fragmented condition. If second storage area 153 had been alternatively defined as storing a beginning half of a hypothetical file number 1532 (not shown) and first storage area 152 had been alternatively defined as storing the ending half of the same hypothetical file number 1532, then hypothetical file number 1532 might be considered to be fragmented because a jump between nonsequential storage areas (e.g., nonadjacent tracks) is needed to span from the end of second storage area 153 to the beginning of first storage area 152.

The data recorded within the primary storage subsystem 150 may be brought into subsystem 150 through a variety of secondary data conveying means 130 including but not limited to: floppy diskettes, compact-disks (CD ROM), tape, and over-a-network downloading from a file server computer (not shown) or the like. The data may also enter through the system I/O module 160.

Each time new files are added to the primary storage (hard disk) subsystem 150, sub-areas (e.g., allocation blocks) in a free space portion 157 of the primary storage subsystem 150 are re-allocated for storing the newly-added data and the directory structure 151 is modified accordingly.

Each time old files are deleted, the corresponding sub-areas are re-allocated back to the free space portion 157 and the directory structure 151 is modified accordingly. The free space 157 may be fragmented as indicated by the separation between its respective free space storage areas 157a and 157b or it may be constituted by one contiguous storage area.

When files such as 154 become randomly fragmented, a disadvantageous set of consequences normally follow. The directory structure 151 becomes larger and more complex as it tries to keep track of more and more discrete fragments. The larger directory structure 151 disadvantageously consumes storage space that could be otherwise used for storing user data.

The execution time of programs such as 145 may increase disadvantageously because of the latency associated with random file fragmentation. Program 145 may wish to quickly sequence through the data of a second stored fragment of a given file immediately after having sequenced through the data of a first stored fragment of the same file. But the operating system (OS) may have to first pause to consult the directory structure 151 and to thereby locate the second fragment. As the directory structure 151 grows bigger and more complex, the time for consulting it may grow longer. The OS may have to pause further to fetch the spaced-away data of the second fragment before being able to service the requests of program 145.

As file fragmentation increases, the total latencies for all the OS consult and fetch operations grows disadvantageously. This slows down the execution of program 145. It also tends to slow down the execution of other programs. When program 145 utilizes system resources such as bus 110, CPU 120 and primary storage subsystem 150 for longer periods of time than absolutely necessary, due to file fragmentation latency, it reduces the availability of these limited resources for servicing other tasks. The other tasks may include the servicing of network requests introduced through the I/O module 160. Network response time may suffer as a result. Thus it can be seen that random file fragmentation can have adverse effects that spread globally through a network rather than being limited to the local computer system 100.

Needless to say, the disadvantages of file fragmentation have long been recognized and a limited number of methods have been devised for defragmenting disk files.

Figure 2:
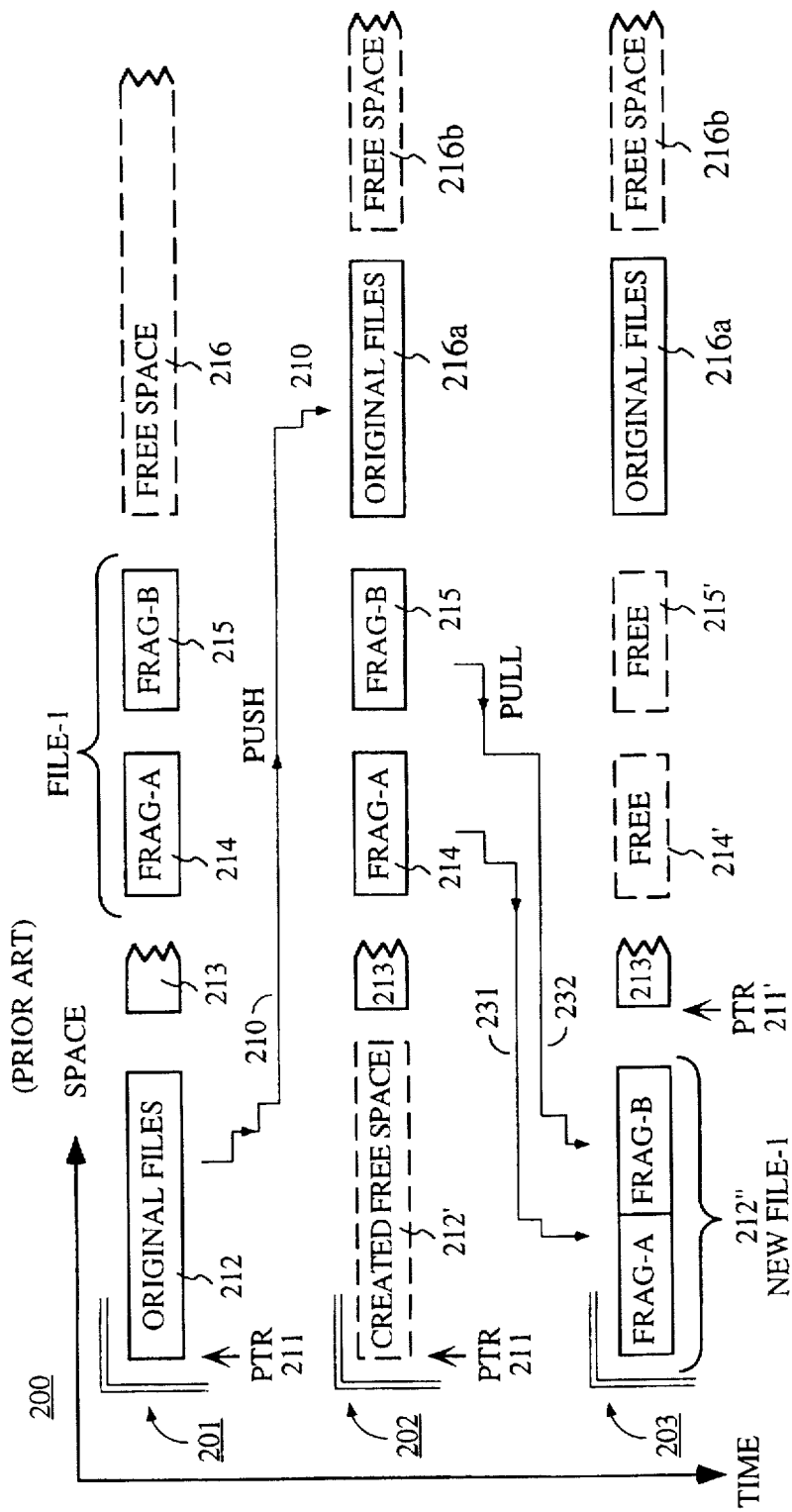
FIG. 2 is a time versus storage-space diagram illustrating a conventional push-pull approach for carrying out disk defragmentation.

FIG. 2 illustrates in terms of time and storage space, a conventional method 200 for reorganizing a disk so as to defragment its files. This conventional method 200 is referred to herein as the 'push-pull method' in that whole files are first pushed out of the way to create a large, continuous vacancy and then all the fragments of one or more other whole files are pulled into the vacancy.

A physical starting state of the disk is indicated as 201. At the time of starting state 201, storage areas 214 and 215 store respective first and second fragments, FRAG-A and FRAG-B, of a first file named, FILE-1. FILE-1 is to be defragmented.

A defragment process pointer 211 initially points to the beginning of a destination storage area 212 which is presently occupied by one or more original files. Further data is stored in adjacent region 213. Region 216 defines free space for the first state 201.

In a first step 210 of the conventional push-pull reorganization method 200, the original files in region 212 are moved in whole (pushed) into portion 216a of system free space 216 in order to open up new free space at their original location. The original storage area is denoted as 'created free space' 212' in the resulting second state 202. The original system free space 216 is reduced to area 216b.

In a second part of the conventional push-pull reorganization method, the data fragments of areas 214 and 215 are moved to the newly-created, continuous free space 212' as indicated by PULL operations 231 and 232. This creates a non-fragmented version of file FILE-1 in region 212" in state 203. The non-fragmented version 212" of file FILE-1 is composed of original data fragments FRAG-A and FRAG-B abutted in the proper sequence against one another as indicated for third state 203. The disk regions that previously stored FRAG-A and FRAG-B now become parts of the free space as indicated at 214' and 215'.

At the completion of the third state 203, the process pointer moves to new position 211' and the conventional push-pull process 200 then repeats for defragmenting a next-identified file (FILE-2, not shown).

Figure 3A:
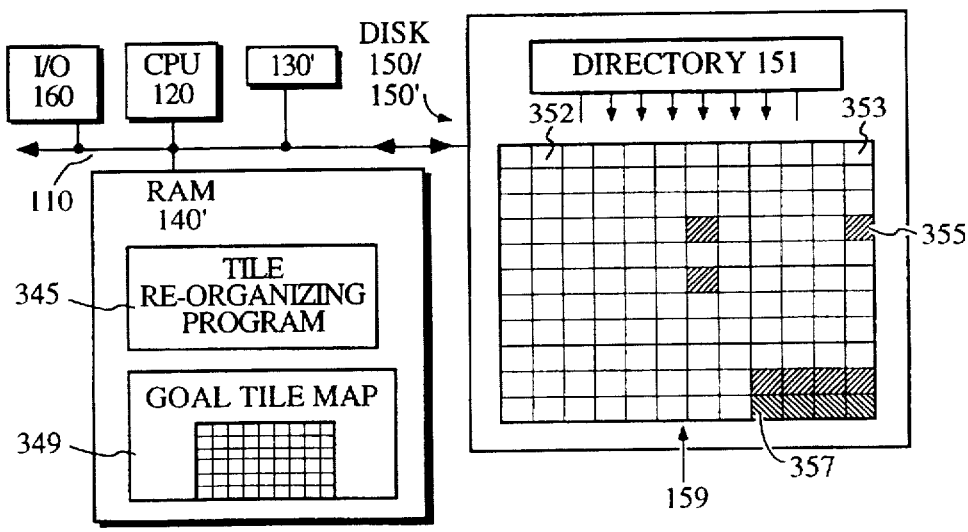
FIG. 3A is a revised diagram of the computer system of FIG. 1, showing how the file storage space may be subdivided into tiles for carrying out an opportunistic tile-pull and vacancy-fill method of storage space reorganization in accordance with the invention.

FIG. 3A illustrates a revised view of computer system 100. As indicated at 159, the file storage area of primary storage (hard disk) subsystem 150 is now seen as being subdivided into a regular set of same-sized tile spaces each containing either a 'tile' of data or constituting a vacancy position that may be filled with a tile of data.

The boundaries of each tile space correspond to the boundaries of one or more storage sub-area such as the boundaries of one or more sectors or of one or more allocation blocks.

Tile spaces that do not contain file data are indicated to constitute vacancy positions by use of cross-hatching in FIG. 3A such as at 357 and 355. Tile spaces that contain file data are indicated by no-hatching such as at 352 and 353. By way of correlation with FIG. 1: tile 352 may be defined by the data in a first storage sub-area that stores a corresponding part of file 152, tile 353 may be may be defined by data in a second storage sub-area that contains part of file 153, and vacancy position 357 may be may be defined by a third storage sub-area that is designated as being part of free space fragment 157b.

When the primary storage subsystem has its original data organization, as dictated by its initial directory structure 151, the primary storage subsystem is referenced as 150. When the primary storage subsystem is later reorganized to have a goal data organization, as dictated by a soon-described goal tile map 349, the primary storage subsystem is referenced as 150'. The revised directory structure or reorganized subsystem 150' is referenced as 151'. The system containing reorganized subsystem 150' and revised directory structure 151' is referenced as 100'.

Figure 3B:
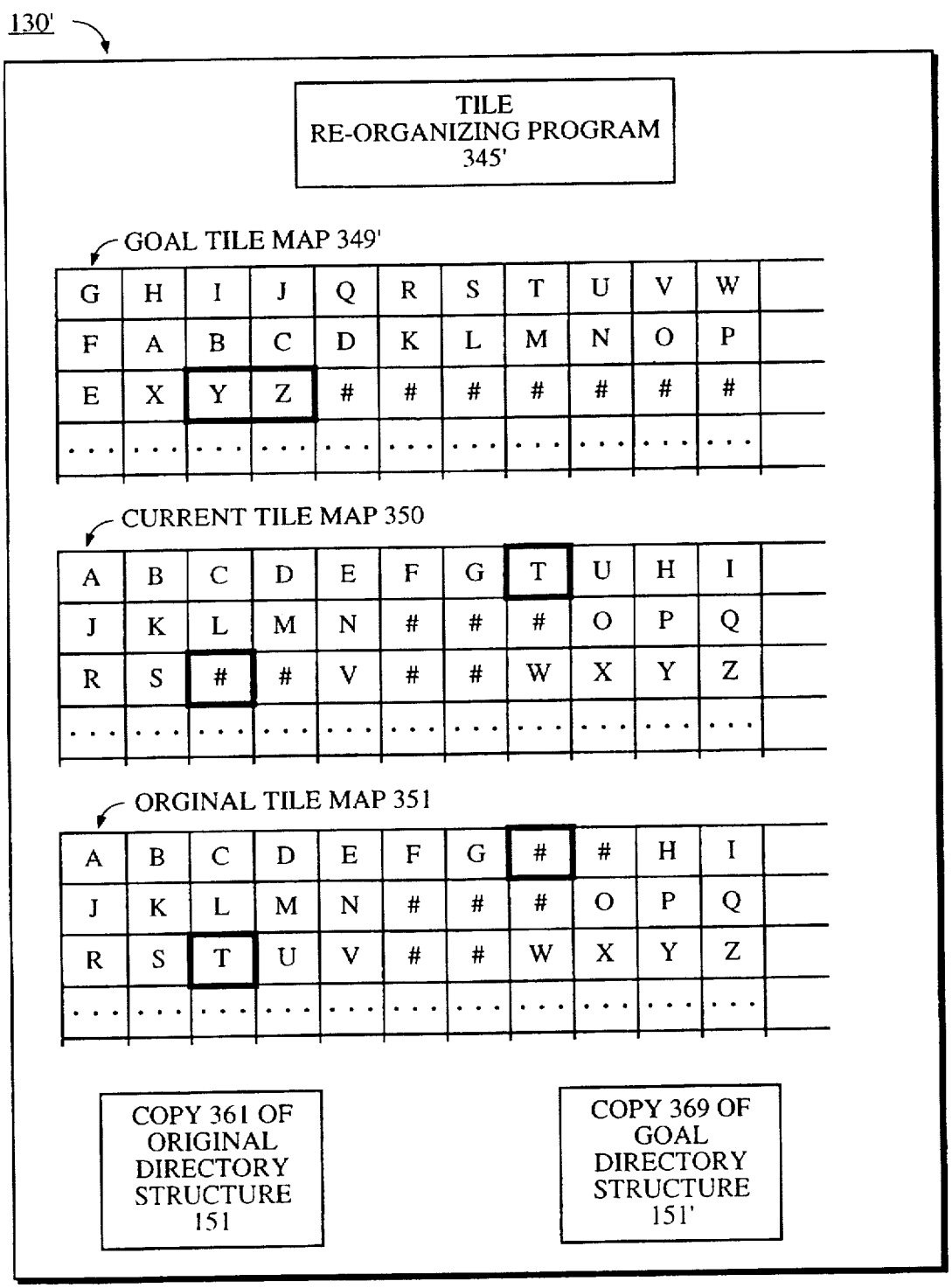
FIG. 3B shows a secondary storage unit (e.g., a floppy diskette) having recorded thereon a plurality of data structures including a tile-reorganizing program in accordance with the invention.

In accordance with the invention, a tile-reorganizing program 345 is loaded into system memory 140 of system 100. A corresponding goal tile map 349 may also be loaded into system memory 140. When system memory is loaded with all or a currently executable part of the tile-reorganizing program 345 system memory 140 is referenced as 140'. The tile-reorganizing program 345 may be brought into system memory 140' from a number of sources, including but not limited to: a secondary data conveying means 130' such as shown in FIG. 3B that contains a source copy 345' of part or all of the executing program 345; from the primary storage subsystem 150; and/or from the system I/O module 160.

The tile-reorganizing program 345 identifies and cooperates with a predefined goal tile map 349. The goal tile map 349 may be loaded into system memory 140' and/or it may be kept in another storage area such as indicated at 349' of FIG. 3B. Like the tile-reorganizing program 345, part or all of the goal tile map 349 may be brought into system memory 140' from a number of sources, including but not limited to: the secondary data conveying means 130' (e.g., floppy diskette); the primary storage subsystem 150; and/or the system I/O module 160. A backup copy 349' (FIG. 3B) of the goal tile map 349 should be stored somewhere other than just in system memory 140 or primary storage subsystem 150 since the former is subject to data loss upon loss of power and the latter may be reorganized such that its copy of the goal tile map is corrupted.

The goal tile map 349 indicates the desired goal state for the tiles after the tiles of file storage area 159 have been reshuffled in accordance with the invention.

The tile-reorganizing program 345 instructs the system processing unit (e.g., CPU 120 or another instructable processing means) to rearrange the tiles 352, 353, etc. of file storage area 159 using an opportunistic vacancy-fill (OVF) method in accordance with the invention. Completion of the opportunistic vacancy-fill method produces a tile arrangement in file storage area 159 corresponding to the tile arrangement defined by the machine-readable goal tile map 349. (See also the original and goal tile maps shown respectively at 351 and 349' of FIG. 3B.)

A first method 400 in accordance with the invention is shown by the flow chart of FIG. 4 to start at entry step 401 and to comprise the subsequent steps of:

(a) identifying in a re-organizable storage space (all or part of 159), one or more files or groups of files or other subregion whose data is to be reorganized (step 402);

(b) subdividing the re-organizable storage space 159 into a plurality of tile spaces (352, 353, preferably same-sized tile spaces), where each tile space corresponds to one storage sub-area or to a successive plurality of logically-adjacent storage sub-areas (step 404) and where each tile space stores a corresponding 'tile's worth' of file data or alternatively constitutes a tile-fillable vacancy;

(c) before making associated tile moves, defining as a goal state 349 and recording as such, the goal resting position of each tile of data in the re-organizable storage space (step 406);

(d) identifying an already existing vacancy space (e.g., 355) within the re-organizable storage space that is large enough to receive one or more tiles' worth of source data from an occupied one or contiguous plurality of tile spaces (step 410);

(d.1) if there is more than one such vacancy space, preferably selecting a largest such vacancy space that is the goal resting place of one or more source tiles belonging to one or more of the files or groups of files that are to be reorganized (step 412);

(d.2) if there are no such vacancy spaces, creating at least one such vacancy space within the re-organizable storage space, preferably by moving away an existing tile that is not currently at its defined goal resting position, where the to-be-moved tile occupies a goal site of a source tile in the files or groups of files that are to be reorganized (step 414);

(d.2a) optionally within step 414, for the case where execution of step 414 is forced by the below-described optional step 426 even though there are vacancies, before moving the existing tile, scanning the still-existing vacancies for an area that is also defined as a vacancy within the goal tile map 349;

(d.2b) optionally within step 414, if above step (d.2a) locates a current vacancy that is also a defined as a vacancy within the goal tile map 349, moving the existing tile to that located vacant area, and if not, otherwise temporarily moving the existing tile to system free space in order to forcibly create the desired vacancy and scheduling a later return of the moved tile to a vacancy in the address space of the goal tile map 349 after new vacancies have been created opportunistically as a result of the forced vacancy creation of step 414;

(e) moving into the identified vacancy space one or more source tiles from the identified files (or from the other source subregions) where the moved source tiles are preferably ones having the currently identified vacancy space as the assigned goal resting position of those moved one or more source tiles (step 416);

(f) designating the source location or locations of the just-moved, one or more source tiles as vacancy space (step 418);

(g) each time the last source tile of a given file (or of another defined source subregion) is moved into its goal resting position, updating the directory structure 151 to reflect the new structure of the fully reorganized file (step 419);

(h) repeat method steps (d) through (g) until the goal state is achieved (step 420 and loop-back path 425-426-427);

(h.1) optionally within portion 426 of loop path 425-426-427, testing the directory structure 151 to see if the current file structure is becoming overly fragmented such that the present number of fragments is approaching (e.g., it is within last 10% or less of) the maximum capacity of directory structure 151 to keep track of so many fragments, and if so, forcing a preventative vacancy creation by forcing next step 410 to automatically branch to step 414 even if there still are other vacancies available for filling by step 412;

(h.2) optionally within portion 426 of loop path 425-426-427, examining the statistics of the more recent tile pulls (e.g., those in the last J invocations of step 416, where J is a predefined whole number) to see if they are degenerating mostly towards tile pulls of essentially the smallest kind because there are only small vacancies available, and if so, forcing a preventative creation of a substantially larger vacancy by forcing next step 410 to automatically branch to step 414 even if there are other vacancies still available for opportunistic filling by step 412; and (i) upon reaching the goal state (step 420 and step 430 by way of exit path 429), updating the directory entries for free space within the re-organizable storage space to account for free space created or deleted as a result of the tile moves.

In one version of system 100' (FIG. 3A) that carries out the above file-structure reorganizing method 400, a floppy diskette 130' or other equivalent nonvolatile, writable secondary storage means (e.g., writable optical disk, magnetic tape, EEPROM, etc.) is operatively coupled to the system bus 110 and stores a source copy 345' of the tile-reorganizing program 345 as shown in FIG. 3B. The source copy 345' of the tile-reorganizing program is loaded into system memory 140 for execution. The secondary storage means 130' further stores a source copy 349' of the goal tile map 349. The source copy 349' of the goal tile map is prerecorded in the secondary storage means 130' and is optionally duplicated into system memory 140 for faster access thereto by the tile-reorganizing program 345.

The goal tile map 349 can be simply a table indicating a one-for-one correspondence between uniquely identified tiles (A,B,C, etc.) and the tile spaces that hold the data of these tiles. Other, more complex mapping structures are also contemplated, such as for example one wherein the identity of vacant tile spaces is explicitly identified and wherein each tile is explicitly linked to a specific file_name.

For purposes of safety, the secondary storage means 130' should additionally store a current tile map 350 indicating the current position of all tiles and vacancies in the re-organizable storage space 159. This current tile map 350 should be updated by the tile-reorganizing program 345 each time that tiles are moved in the file storage area 159 of the primary storage subsystem 150.

For further safety, the secondary storage means 130' should store an original tile map 351 indicating the original positions of all tiles and vacancies in the re-organizable storage space 159 prior to the start of tile reorganization. This allows one to automatically return to the original tile organization if so desired.

The secondary storage means 130' may further store a copy 369 of the disk directory 151 as it should appear after tile reorganization completes. For purposes of safety, the secondary storage means 130' should additionally store a copy 361 of the disk directory 151 as it appears before the start of tile reorganization. When tile reorganization completes, the copy 369 of the goal disk directory may be moved by the tile-reorganizing program 345 into the reorganized primary storage subsystem 150' to define the new directory structure 151' of subsystem 150'.

If for some reason, during or at the end of the tile reorganization process, it becomes desirable to return to the original file structure organization, the original tile map 351 can be renamed as the goal tile map and the copy 349' of the goal tile map can be reciprocally renamed as the original tile map and the tile-reorganizing program 345 can be instructed to proceed accordingly.

Also, if for some reason during the tile reorganization process, it becomes desirable to change the definition of the goal state, the tile-reorganizing program 345 can be temporarily halted, the working copies 349/349' of the goal tile map can be accordingly modified, and the tile-reorganizing program 345 can be thereafter instructed to continue from the state indicated by the current tile map 350.

In the example of FIG. 3B. vacant tile spaces are indicated with the pound symbol '#'. As seen, the primary storage subsystem 150 is originally organized as indicated by map 351 to have the tile structure:

ABCDEFG##HIJK . . . etc.

The goal tile structure (map 349') is differently organized as:

GHIJQRSTUVWFA . . . etc.

The sample of the current tile map 350 shows that during the transition from the original tile organization (as indicated by map 351) toward the goal state (as indicated by map 349'), the original vacancy (#) immediately following the G tile has been opportunistically filled with the T tile and the tile space that originally held the T tile has become vacant. Similarly, the original vacancy (#) immediately preceding the H tile has been opportunistically filled with the U tile and the tile space that originally held the U tile has become vacant.

Later, as indicated in the goal tile map 349' of FIG. 3B, the Y and Z tiles opportunistically fill the vacancies left behind in the tile spaces originally occupied by the T and U tiles.

The above described file-structure reorganizing method 400 is but one of many machine-implemented schemes that may be used for carrying out tile reorganization in accordance with the opportunistic tile-pulling, vacancy-filling method of the invention.

The below, Queue-Based Pull-Fill algorithm shows another machine-implemented method for carrying out tile reorganization in accordance with the invention. Cross reference is made to elements in the "500" number series of FIG. 5 where appropriate.

Queue-Based Pull-Fill Algorithm
  Memory Allocations
    Allocate Move_Buffer space (510) in system RAM for supporting tile moves.
    Allocate Move_Request_Queue space (520) in system RAM for receiving data move requests on a first in (FI) basis and for sorting the received requests to enable servicing of the move requests on a disk read minimizing and disk write minimizing basis.
    Allocate Opportunistic_Vacancy_Queue space (530) in system RAM for storing vacancy identifications on a first in, first out (FIFO) basis.
    Allocate Goal_State_Map space (549) in system RAM for storing goal tile destination information.
main( )
  Repeat until Goal State is Reached
  Pull:
    (a) Opportunistically search for best-to first-fill vacancies:
      (a.1) In limited time window_X, search for and temporarily record the identity of currently available vacancy spaces in reorganizable storage space (550);
      (a.2) Among the vacancies that are found and recorded, choose and remember only the vacancies that are goal state destinations which are to be occupied, according to the Goal_State_Map (549), at least partially (and more preferably fully) by source data tiles.
      (a.3) Among the chosen destination vacancies, if any, if there is a continuous vacancy that can store its entire source file, as defined by the Goal_State-Map, select that vacancy, push its identity onto the Vacancy_Queue (530) and exit this search routine (a).
      (a.4) Among the chosen destination vacancies, if any, if there is a current vacancy that can be filled without instigating a 'Flush' of the Move_Request_Queue (520) or without increasing the degree of file fragmentation, select that vacancy, push its identity onto the Vacancy_Queue (530) and exit this search routine (a).
      {See below for more information about flushing the Move_Request_Queue and when this operation is initiated.}
      (a.5) Otherwise, if among the chosen destination vacancies, if any, if there is one vacancy at least as large as any found and remembered so far, select that one vacancy, push its identity onto the Vacancy_Queue (530) and exit this search routine (a). If smaller vacancies are being temporarily remembered, forget them upon the exit from this search routine (a). (Clear the vacancy recording scratchpad of this routine (a).)
    (b) Repeat above steps (a.1) through (a.5) N times {Continue searching for best vacancies to first fill}.
    (c) If no vacancy found thus far, go to Push (starts at step g).
    (d) If no vacancy has yet been selected and added onto the Opportunistic_Vacancy_Queue (530),
      (d.1) If there is only one vacancy remembered on the scratchpad list, select that one vacancy, push its identity onto the Vacancy_Queue and exit to step (f.1).
      (d.2) Otherwise, select from the list of remembered vacancies, the vacancy that would combine and thus defragment the most file fragments, or alternatively that would create the least number of new fragments when filled, push its identity onto the Vacancy_Queue and go to step (f.1).
    (f.1) Remove in FIFO style, the next vacancy identifier off from the Opportunistic_Vacancy_Queue (530), locate the intended ultimate occupants (source tiles) for that vacancy in the Goal_State_Map (549), and Queue onto the Move_Request_Queue (520) a corresponding request to move the intended occupants of the identified vacancy into the identified vacancy. {See below for Move_Queue servicing operation. Each move can invoke one or more reads of data from the disk into the Move_Buffer 510 followed by one or more writes of data from the Move_Buffer 510 to disk.}
    (f.2) Test directory structure for number of fragments created thus far. If number of fragments is approaching (e.g., it is within last 10% or less of) maximum capacity of directory structure to keep track of such fragments, force a preventative Push that reduces number of fragments by now going to Push step (g).

(f.3) Test statistical distribution of most recent (e.g., last M/2 or less) repetitions of Pull to see if they consist mostly of or essentially entirely of minimally-sized tile pulls that will eventually force a Flush of the Move__-Request_Queue, and if so, go to Push step (g) now.

Repeat Pull M times more.
Push:

(g) Search for a file or file fragment that is not yet in its final goal location.

(h) If none found, Flush the Move_Request_Queue and exit this Push routine. {See below for Flush operation.}

(i) Before using up system free space, preferably first search for tile spaces that are currently vacant and are defined in the Goal Tile Map 549 as also being vacant.

(j) Queue a request onto the Move_Request_Queue 520 to move as many of the found files and/or fragments as will fit, either into the found free space inside-the-Goal-Tile-Map of step (i), or if none was found, into system free space.

Repeat Push J more times.

Queuing a New Move Request onto the Move_Request_Queue (k) If the Move_Buffer is completely full, before queuing on a new request first Call the Flush_the_Move_Request_Queue routine.

(l) Otherwise, if the new request to be queued overlaps a location specified by any request already in the Move_Request_Queue 520, first Call the Flush_the_Move_Request_Queue routine.

(m) Otherwise, while there is still a new request or a remnant of a new request still not queued on:

(m.1) If the Move_Buffer 510 is completely full, first Flush the Move_Request_Queue (execute its contents and thereafter delete them)

(m.2) Enter into the Move_Request_Queue a revised move request for moving as much of the current new request as the free Move_Buffer space 510 currently allows and save the remnant of the move request, if any, as a still pending move request that needs to be queued onto the Move_Request_Queue.

Flushing the Move_Request_Queue (n) Sort the Move_Request_Queue 520 and assign Move_Buffer space 510 to queued-on move requests in such a way as to combine as many disk read operations and/or disk write operations as possible so as to minimize the number of separate disk reads and writes that will be performed during this flush. (In other words, combine the reads of physically adjacent source tiles so as to obtain maximum data volume throughput in each disk read operation and combine the writes to physically adjacent vacancy areas so as to obtain maximum data volume throughput in each disk write operation—to the extent that the space available in the pre-allocated Move_Buffer 510 allows.)

(o) In order of physical source location on the disk 150, read each requested tile of data 505 and copy the read data into system memory 140 to the extent allowed by the pre-allocated Move_Buffer 510 and the algorithm for minimizing the number of separate disk reads and writes.

(p) In order of physical destination location on the disk 150, write each requested tile of data that is now stored in the Move_Buffer 510 back out to the corresponding vacancy area on disk.

(q) Update the disk's catalog structures 151 and the Current Tile Map 550 (if any) to reflect all moves just made in preceding steps (o) and (p).

(r) Exit this Flush routine.

In the above Queue-Based Pull-Fill algorithm, N and M are each empirically chosen positive integers (>0), the length of time window_X is empirically chosen, and the sizes and formats of each of the Move_Buffer, Move_Request_Queue, Opportunistic_Vacancy_Queue, and Goal_State_Map are empirically defined.

Figure 5:
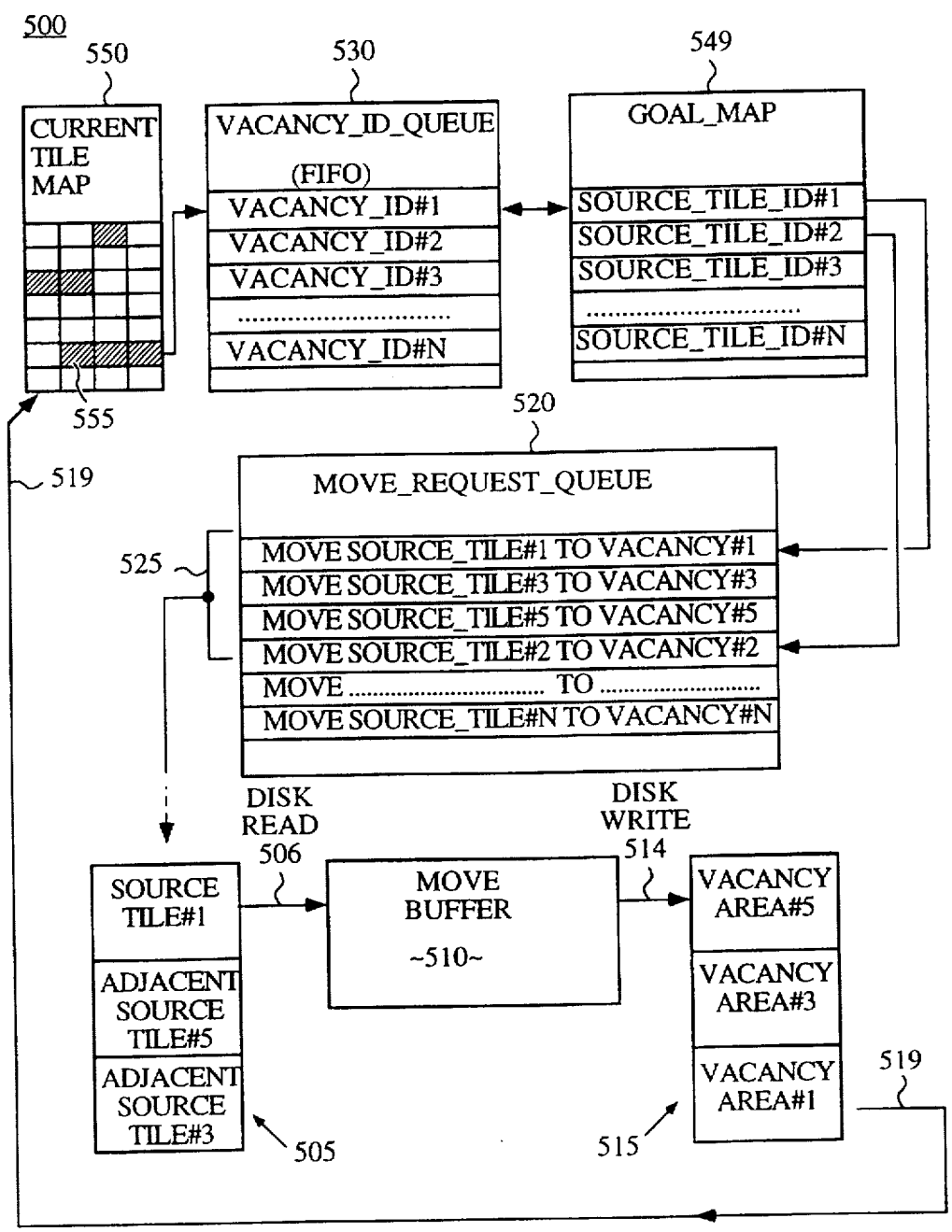
FIG. 5 is a data flow diagram used for explaining a tile-pull and vacancy-fill reorganization system in accordance with the invention.

Referring to FIG. 5, a process 500 in accordance with the invention is described as follows.

The largest vacancy areas (such as hatched area 555 which covers three tile's worth of storage space, which tiles are access-wise adjacent) are picked first out of the available vacancy areas that are indicated to be so-vacant by the Current Tile Map 550 (or its equivalent).

The reason for selecting and processing the largest of the available vacancy areas before doing the same for smaller vacancy areas is that the algorithm will opportunistically tend towards the creation of yet more large-sized vacancy areas and this will generally speed the rate at which tiles are moved to their goal resting positions.

Each fill of one vacancy area and simultaneous creation of another vacancy area at the source location can be viewed as a vacancy move. As vacancies (holes) move about the disk storage space due to tile reshuffling, some vacancies can attach to, and combine with other vacancies to thereby create even larger vacancies. The algorithm tries to encourage such vacancy combination by constantly seeking out the larger vacancy areas as opposed to the smaller vacancy areas.

When a largest or a relatively larger one of the vacancy areas is found, and that vacancy area is further qualified as the goal resting place for the largest or a relatively large amount of tile data, the situation is taken advantage of by combining the disk-read portions (data fetch portions) of the respective moves of the multiple tiles into one disk read operation or one corresponding data fetch operation. This reduces overall disk-read time.

As seen in FIG. 5, the identifications (e.g., VACANCY_ID#1) of the opportunistically picked out vacancy areas are loaded into FIFO 530 for processing on a first-in first-out basis.

Each vacancy identification (e.g., VACANCY_ID#1) is matched with a source tile identification (e.g., SOURCE_TILE_ID#1) that is retrieved from the Goal Tile Map 549 and that identifies the source tile that should ultimately fill the vacancy area when the goal state is reached.

The combination of the matched source tile identification (e.g., SOURCE_TILE_ID#1) and the vacancy identification (e.g., VACANCY_ID#1) is used to generate a corresponding move request (e.g., MOVE SOURCE TILE#1 TO VACANCY#1) and the latter request is recorded into the Move_Request_Queue 520.

As (or after) the Move_Request_Queue 520 fills up with requests, the requests are sorted and recombined so as to minimize the number of insular disk reads and/or insular disk writes that will take place. One such sort and combine operation is indicated by bracket 525.

As seen in the example at 505, source tiles, TILE#1, TILE#3 and TILE#5 are access-wise adjacent to one another such that a single disk read can fetch the data of all three tiles in substantially minimal time and copy that data into the Move_Buffer 510. Reading all three tiles of data in one combined operation avoids the time delay penalties of performing three insular disk reads instead. Thus, the disk-read portions of moves requests #1, #3 and #5 are preferably combined into one unified disk-read operation 506. And as indicated by bracket 525, in recognition of this, the corresponding tile move requests #1, #3 and #5 have been sorted and grouped together in the Move_Request_Queue 520 so that the unified disk-read operation 506 can be performed with relative ease.

As further seen in the example at 515, vacancy areas, VACANCY#1, VACANCY#3 and VACANCY#5 are access-wise adjacent to one another such that a single disk write operation can be used to fetch the data of all three vacancies from the Move_Buffer 510 and to copy that data in sequence to the respective vacancy areas. Writing all three areas' worth of data in one combined operation avoids the time delay penalties of performing three insular disk writes instead. Thus, the disk-write portions of moves requests #1, #3 and #5 are preferably combined into one unified disk-write operation 514. Although not specifically shown, it should be apparent that during the one unified disk-write operation 514, data is fetched sequentially from the Move_Buffer 510 in accordance with the access-wise adjacency of destination vacancy areas, VACANCY#5, VACANCY#3 and VACANCY#1.

Of course, it will not always be possible to find and combine plural move requests for which there are both access-wise adjacent source tiles 505 and access-wise adjacent vacancy areas 515. In those instances, the next level of optimization may be set so as to sort and combine those move requests (hereafter also 'adjacency partners') for which there are either access-wise adjacent source tiles or access-wise adjacent vacancy areas.

Lastly, for those move requests in the Move_Request_Queue 520 that have no such adjacency partners either on the disk-read or disk-write side, it is possible that a later queued-on request will define such a partner. These partnerless move requests within the Move_Request_Queue 520 may be saved for last in hope that a partner will show up. On the other hand, if one or more of the partnerless move requests that are already in the Move_Request-Queue 520 already defines a largest amount of data to be moved in accordance with that partnerless move request, it may be better from a performance viewpoint to execute such a largest move immediately and thereby create a new, relatively large vacancy rather than waiting for a later-arriving request to arrive in the Move_Request_Queue 520 where the latter might serve as an adjacency partner for the partnerless move request. This is a design choice that can be adjusted empirically within the algorithm to suit the disk read and disk write characteristics of the specific machine on which the algorithm is implemented.

After both the disk-read side and disk-write side of a given move request is executed, the request is removed from the Move_Request_Queue 520 and the Current Tile Map 550 is updated to reflect the latest positioning of tiles and vacancies. Alternatively or additionally, the directory structure 151 can also be updated accordingly at this time. This update operation is indicated by feedback path 519.

The processes of: vacancy-picking (indicated by 550 feeding into 530), source tile matching (indicated by the joint coupling between 530 and 549), move request generation (indicated by 549 coupling into 520), move request sorting and combining (indicated by the requests within 520 that are bracketed by 525), move request execution (indicated by the data flow from 505 through 510 to 515), and current tile map updating (519) can be carried out as interlocked concurrent threads of computer-implemented operations if desired.

As should now be apparent, the opportunistic vacancy-fill (OVF) algorithm assumes that the starting and goal states of the disk (i.e. the present and desired future locations of all files and/or tiles) have been predetermined. The start and goal states (351 and 349 respectively) may be mapped and recorded using identical map formats, namely, each as an array whose elements have a one-to-one correspondence with the atomic allocation units (storage sub-areas) of the disk. Each array element may contain two indices, the first to designate which file occupies (or will occupy) the corresponding area on the disk, and the second to designate which portion of that file occupies (or will occupy) the corresponding area on the disk.

A variety of methods can be used to define and record the goal state independently of the opportunistic vacancy-fill (OVF) algorithm. Several approaches to creating the goal tile map 349 could be employed to make the OVF tile reorganizing method accomplish different objectives. A simplistic goal state for defragmenting files could be produced as follows:

Create Defragmented Goal Tile Map:
 (a) Begin with an empty goal array, point to first empty tile space (first array element).
 (b) For each file on the disk 150:
  (b.1) Define n=total number of allocation blocks needed by this file.
  (b.2) Assign blocks 1 through n of this file to the next n empty elements of the goal array.

The above goal state defining algorithm does not specify any preference for the order in which the files will be on the disk, but it will cause all files to be defragmented because each file is assigned to contiguous elements of the goal array.

More sophisticated goals could be defined so as to gather files into logical groupings according to for example, file 'type' or file 'usage' by a specified one or more users and/or by a specified one or more application programs. If it can be determined that certain files should remain in fixed locations on the disk due to expectations of other software (such as copy-protection schemes), this can be accomplished simply by assigning these files to the same positions in the goal state that they occupy in the starting state.

If other software is available for monitoring and analyzing disk usage patterns, the output of such usage monitoring and analyzing software can be used to define a goal state 349 that assigns the files that are most frequently used by a designated one or more system users to the fastest portion of the disk 150. This could greatly enhance the overall performance of the primary storage (hard disk) subsystem 150.

As indicated above, the goal state can intentionally be a highly fragmented organization of all files on the primary storage subsystem 150. Such a goal state may be used to test the performance of application programs under worst case conditions.

As indicated above, the goal state can intentionally interleave specific fragments of specific files, where the files are ones that are commonly used by and frequently switched between during the running of a specific application program. The interleaving of such fragments may provide faster performance for the specific application program.

The above disclosure is to be taken as illustrative of the invention, not as limiting its scope or spirit. Numerous modifications and variations will become apparent to those skilled in the art after studying the above disclosure.

Given the above disclosure of general concepts and specific embodiments, the scope of protection sought is to be defined by the claims appended hereto.

What is claimed is:

1. A method for reorganizing file data stored in a re-organizable storage space, where the storage space has addressable storage sub-areas each for storing data and where each file is defined by a directory structure as data contained in a directory-specified organization of storage sub-areas, said method comprising the steps of:

(a) identifying one or more files or groups of files that are to be reorganized, the identified files or file groups residing in the re-organizable storage space;

(b) subdividing the data of the re-organizable storage space into tiles, each tile corresponding to one or more access-wise adjacent storage sub-areas;

(c) recording as a definition of a goal state, indications of goal locations for each tile in the re-organizable storage space;

(d) identifying an already-existing vacancy space within the re-organizable storage space, and if none; creating at least one such vacancy space within the re-organizable storage space and identifying the created vacancy space; and (e) moving (pulling) into the identified vacancy space the data of one or more source tiles that have that identified vacancy space defined by the goal state as the goal location for the moved one or more source tiles.

2. A machine-implemented file data reorganizing method according to claim 1 further comprising the step of:

(f) automatically repeating said vacancy identifying step (d) and said tile moving step (e) until the goal state is achieved.

3. A file data reorganizing method according to claim 1 further comprising the step of:

(f) repeating said vacancy identifying step (d) and said tile moving step (e).

4. A file data reorganizing method according to claim 3 further comprising the step of:

(g) upon completion of a move of a last source tile of a given source file to that tile's destination as defined by the goal state, updating the directory structure to reflect the new organization of the re-organized given file.

5. A file data reorganizing method according to claim 4 further comprising the step of:

(h) upon completion of a move of a last source tile to that tile's destination as defined by the goal state, said last move achieving the goal state, updating the directory structure to reflect consequential changes to free space within the re-organizable storage space as a result of the achieved goal state.

6. A file data reorganizing method according to claim 3 further comprising the steps of:

(g.1) for each identified vacancy space and corresponding one or more source tiles that have that identified vacancy space defined as their goal location, generating and recording a respective move request;

(g.2) collecting a plurality of move requests; and (g.3) sorting through the collected move requests to identify as a set of adjacency partners those move requests whose servicing either calls for respective reads of data from respective and access-wise adjacent source tiles or calls for respective writes of data to respective and access-wise adjacent vacancy areas.

7. A file data reorganizing method according to claim 6 wherein for each set of adjacency partners whose servicing calls for respective reads of data from respective and access-wise adjacent source tiles, said method further comprises the step of:

(g.4) combining into a unitary data read operation, the data from said respective and access-wise adjacent source tiles.

8. A file data reorganizing method according to claim 6 wherein for each set of adjacency partners whose servicing calls for respective writes of data to respective and access-wise adjacent vacancy areas, said method further comprises the step of:

(g.4) combining into a unitary data write operation, the data filling said respective and access-wise adjacent vacancy areas.

9. A file data reorganizing method according to claim 1 wherein said step (d) of identifying a vacancy space includes, for the case where there are plural already-existing vacancy spaces, (d.1) identifying a largest one of said plural already-existing vacancy spaces that is to be occupied in accordance with the goal state by a correspondingly largest amount of file data; and wherein said step (e) of moving one or more tiles includes, (e.1) before filling smaller vacancy areas, moving into the identified largest vacancy space the corresponding largest amount of file data that is contained in the one or more source tiles that have said identified largest vacancy space defined as their respective goal location.

10. A file data reorganizing method according to claim 1 wherein said re-organizable storage space is in a nonvolatile memory device selected from the group consisting of: magnetic disk, writable-optical disk, flash EEPROM, EEPROM, and magnetic bubble memory.

11. A file data reorganizing method according to claim 1 wherein said re-organizable storage space is in a magnetic disk.

12. A file data reorganizing method according to claim 11 wherein each of said storage sub-area comprises an integral number of one or more disk sectors.

13. A file data reorganizing method according to claim 1 wherein said re-organizable storage space is in a random access memory device having the capacity to store voluminous amounts of data, said voluminous amounts of data being at least two hundred megabytes.

14. A file data reorganizing method according to claim 1 wherein said step of recording indications of goal locations for each tile is characterized by:

(c.1) a goal state that changes the relative order of two or more tiles with respect to address in said re-organizable storage space.

15. A method for rearranging storage locations of data stored in a re-organizable storage space of a data storage means, where the storage means has addressable storage sub-areas each for storing a predefined maximum amount of data, where said sub-areas are logically linked to one another to thereby define a logical organization for the data contained in said storage sub-areas, said method comprising the steps of:

(a) subdividing the data of the re-organizable storage space into tiles, each tile corresponding to one or more access-wise adjacent storage sub-areas;

(b) providing as a recorded definition of a goal state, pre-recorded indications of goal resting positions for each tile in the storage space of the re-organizable storage means;

(c) identifying an already-existing vacancy space within the re-organizable storage space; and (d) moving into the identified vacancy space the data of one or more source tiles that have that identified vacancy space defined by the recorded goal state as the goal resting position for the moved one or more source tiles.

16. A machine-implemented data reorganizing method according to claim 15 further comprising the step of:
   (e) automatically repeating said vacancy identifying step (c) and said tile moving step (d) until the goal state is achieved.

17. A data reorganizing method according to claim 15 further comprising the step of:
   (e) repeating said vacancy identifying step (c) and said tile moving step (d).

18. A data reorganizing method according to claim 17 further comprising within said step (e) of repeating,
   (e.1) automatically testing the size of one or more recent tile moves; and
   (e.2) in cases where the size of the tested one or more recent tile moves falls below a predefined threshold, creating a new vacancy area within said re-organizable storage space even if there are other vacancy areas already available within the re-organizable storage space.

19. A data reorganizing method according to claim 17 further comprising within said step (e) of repeating,
   (e.1) automatically testing the degree of fragmentation of current files that are being re-organized by one or more one or more recent tile moves; and
   (e.2) in cases where the degree of fragmentation of the tested files falls above a predefined threshold, creating a new vacancy area within said re-organizable storage space even if there are other vacancy areas already available within the re-organizable storage space.

20. A rearranging method according to claim 17 wherein said step of (c) of identifying an already-existing vacancy space further includes:
   (c.1) creating at least one vacancy space within the re-organizable storage space if none is already-existing and identifying the just-created vacancy space as the already-existing vacancy space.

21. A rearranging method according to claim 15 wherein said data storage means is selected from the group consisting of: magnetic disk, writable-optical disk, flash EEPROM, EEPROM, and magnetic bubble memory.

22. A rearranging method according to claim 15 wherein said data storage means includes a magnetic disk.

23. A rearranging method according to claim 22 wherein each of said storage sub-area comprises an integral number of one or more disk sectors.

24. A rearranging method according to claim 15 wherein said data storage means includes a random access memory device having the capacity to store voluminous amounts of data, said voluminous amounts of data being at least two hundred megabytes.

25. A rearranging method according to claim 15 wherein said step of providing pre-recorded indications of goal resting positions for each tile includes:
   (c.1) providing a goal state that changes the relative order of two or more tiles with respect to the addresses of the tiles in said data storage means.

26. A method for defragmenting file data stored in a re-organizable storage space, where the storage space has addressable storage sub-areas each for storing a predefined maximum amount of data, where said sub-areas are logically linked to one another to thereby define a logical organization for the data contained in each said file, and where parts of the data of each file are defined as being logically adjacent to one another, said method comprising the steps of:
   (a) identifying one or more files or groups of files that are to be defragmented, the identified files or file groups residing in the re-organizable storage space;
   (b) subdividing the data of the re-organizable storage space into tiles, each tile corresponding to one or more access-wise adjacent storage sub-areas;
   (c) recording as a definition of a goal state, indications of goal resting positions for each tile in the re-organizable storage space, where said goal state places logically adjacent tiles of each file in access-wise closer adjacency relative to one another than such tiles are in their original state; and
   (d) moving said tiles each from a current position to the corresponding goal resting position defined by the goal state, where a majority of said tile moves are performed just once for each of the moved tiles.

27. A file defragmenting method according to claim 26 wherein said re-organizable storage space is in a nonvolatile memory device selected from the group consisting of: magnetic disk, writable-optical disk, flash EEPROM, EEPROM, and magnetic bubble memory.

28. A method for fragmenting file data stored in a re-organizable storage space, where the storage space has addressable storage sub-areas each for storing a predefined maximum amount of data, where said sub-areas are logically linked to one another to thereby define a logical organization for the data contained in each said file, and where parts of the data of each file are defined as being logically adjacent to one another, said method comprising the steps of:
   (a) identifying one or more files or groups of files that are to be fragmented, the identified files or file groups residing in the re-organizable storage space;
   (b) subdividing the data of the re-organizable storage space into tiles, each tile corresponding to one or more access-wise adjacent storage sub-areas;
   (c) recording as a definition of a goal state, indications of goal resting positions for each tile in the re-organizable storage space, where said goal state places logically adjacent tiles of each file in access-wise non-adjacency relative to one another; and
   (d) moving said tiles each from a current position to the corresponding goal resting position defined by the goal state.

29. A file data fragmenting method according to claim 28 further comprising the steps of:
   (e) after moving said tiles, using the identified one or more files to test the speed of a file-accessing application program.

30. A method for increasing fragmentation of file data stored in a re-organizable storage space, where the storage space has addressable storage sub-areas each for storing a predefined maximum amount of data, where said sub-areas are logically linked to one another to thereby define a logical organization for the data contained in each said file, and where parts of the data of each file are defined as being logically adjacent to one another, said method comprising the steps of:
   (a) identifying one or more files or groups of files whose degree of fragmentation is to be increased, the identified files or file groups residing in the re-organizable storage space;
   (b) subdividing the data of the re-organizable storage space into tiles, each tile corresponding to one or more access-wise adjacent storage sub-areas;
   (c) recording as a definition of an original tile state, indications of original resting positions for each tile in the re-organizable storage space;

(d) providing as a definition of a recorded goal state, pre-recorded indications of goal resting positions for each tile in the re-organizable storage space, where for each identified file whose degree of fragmentation is to be increased, said goal state places one or more of plural and respective source tiles that are access-wise adjacent to one another in the original tile state to one or more destination tiles that are each access-wise non-adjacent with respect to either one of the source tiles or another, logically-adjacent destination tile; and (e) moving said tiles each from a current position to the corresponding goal resting position defined by the goal state.

31. A method for interleave-wise fragmenting file data of two or more files, where said file data is stored in a re-organizable storage space, where the storage space has addressable storage sub-areas each for storing a predefined maximum amount of data, where said sub-areas are logically linked to one another to thereby define a logical organization for the data contained in each said file, where parts of the data of each file are defined as being logically adjacent to one another within the file, and where respective first, second and third parts that respectively belong to at least two different ones of said files are to be interleave-wise accessed one after the other by a predefined program, said method comprising the steps of:

(a) subdividing the data of the re-organizable storage space into tiles, each tile corresponding to one or more access-wise adjacent storage sub-areas;

(b) providing as a recorded definition of a goal state, pre-recorded indications of goal resting positions for each tile in the re-organizable storage space, where said goal state places the respective first through third parts in interleaved access-wise adjacency to one another; and (c) moving said tiles each from a current position to the corresponding goal resting position defined by the goal state.

32. An interleave-wise fragmenting method according to claim 31 wherein (c.1) a majority of said tile moves are performed just once for each of the moved tiles.

33. A method for rearranging storage locations of data stored in a re-organizable storage space of a data storage means, where the storage means has addressable storage sub-areas each for storing a predefined maximum amount of data, said method comprising the steps of:

(a) subdividing the data of the re-organizable storage space into tiles, each tile corresponding to one or more access-wise adjacent storage sub-areas;

(b) identifying as a goal state, pre-recorded indications of goal resting positions for each tile in the re-organizable storage space; and (c) in accordance with the goal state, opportunistically moving tiles that are not in their goal resting positions to such goal resting positions when such goal resting positions are vacant.

34. An instructing apparatus for instructing a target data processing system to re-organize storage locations for data stored in a re-organizable storage space, where the storage space has addressable storage sub-areas each for storing a predefined maximum amount of data, said instructing apparatus providing instructions for causing said target data processing system to perform the steps of:

(a) subdividing the data of the re-organizable storage space into tiles, each tile corresponding to one or more access-wise adjacent storage sub-areas;

(b) identifying as a goal state, pre-recorded indications of goal resting positions for each tile in the re-organizable storage space; and (c) in accordance with the identified goal state, opportunistically moving tiles that are not in their goal resting positions to such goal resting positions when such goal resting positions are vacant.

35. An instructing apparatus according to claim 34 further providing instructions for causing said target data processing system to perform the steps of:

(d) searching said re-organizable storage space for largest ones of currently available vacancies that are to be filled in accordance with the identified goal state with largest amounts of data; and (c.1) within said step (c) of opportunistically moving tiles, if said searching step (d) results in a finding of one or more largest ones of currently available vacancies, moving those tiles that have the found largest ones of the currently available vacancies as their goal resting positions before moving tiles that have smaller ones of the currently available vacancies as their goal resting positions.

36. An instructing apparatus according to claim 35 further providing instructions for causing said target data processing system to perform the step of:

(e) creating a vacancy within said re-organizable storage space that is a goal resting position for at least one tile not currently in its goal resting position if said searching step (d) fails to find any currently available vacancies that are also goal resting positions for tiles not currently in their goal resting positions.

37. An instructing apparatus according to claim 34 further providing (d) machine-readable indications defining a goal state that is identifiable by said step (b) as the identified goal state.

38. An instructing apparatus according to claim 37 further providing (e) machine-readable indications defining an original tile map, the original tile map indicating original positions of tiles and vacancies in the re-organizable storage space prior to the start of reorganization; and (f) instructions for causing said target data processing system to perform the step of:

(f.1) after beginning said opportunistic moving of tiles in accordance with a first identified goal state, changing the identification of the goal state to be said original tile map as the identified goal state and continuing with opportunistic moving of tiles in accordance with the re-defined goal state to thereby return the stored data to its original storage organization.

39. An instructing apparatus according to claim 37 further providing (e) machine-readable indications defining a current tile map, the current tile map indicating essentially current positions of tiles and vacancies in the re-organizable storage space during reorganization; and (f) instructions for causing said target data processing system to perform the step of:

(f.1) after beginning said opportunistic moving of tiles, periodically updating said current tile map so that the updated current tile map indicates the most current positions of tiles and vacancies in the re-organizable storage space.

40. An instructing apparatus according to claim 39 further providing instructions for causing said target data processing system to perform the step of:

(g) searching said updated current tile map for largest ones of currently available vacancies that are to be filled in accordance with the goal state with largest amounts of data; and (c.1) within said step (c) of opportunistically moving tiles, if said searching step (d) results in a finding of one or more largest ones of currently available vacancies, moving those tiles that have the found largest ones of the currently available vacancies as their goal resting positions before moving tiles that have smaller ones of the currently available vacancies as their goal resting positions.

41. A machine system for carrying out data structure reorganization comprising:

(a) a primary storage for storing a plurality of files in a file storage space in accordance with a first file storage organization, where the first file storage organization may be represented as a first mapping of tiles of data each in a corresponding tile space of the file storage space; and (b) file storage reorganizing means, operatively coupled to the primary storage, for reorganizing the storage organization of the primary storage such that one or more of the files are stored after the reorganization in the primary storage in accordance with a pre-defined second file storage organization that is different from said first file storage organization, where the pre-defined second file storage organization may be represented as a second mapping of the tiles of data each in a corresponding tile space; and where the file storage reorganizing means includes:

(b.1) vacancy locating means for searching through the file storage space of the primary storage looking for a to-be-filled vacant space that is to be ultimately occupied according to the second mapping by a corresponding tile of data; and (b.2) tile moving means, operatively coupled to the vacancy locating means, for moving, in response to the finding of said to-be-filled vacant space, the corresponding tile of data from its currently occupied storage space to the found vacant space.

42. A machine system according to claim 41 wherein said vacancy locating means includes:

(b.1a) best vacancy finding means for finding a preferred one or more vacancies among plural vacancies that can be currently filled with corresponding one or more tiles that are not yet in their goal position in accordance with the second file storage organization and outputting identifications of the found one or more vacancies, the preferred one or more vacancies being those currently fillable with the largest amount of tile data in accordance with the second file storage organization; and (b.1b) first-in first-out buffer means, operatively coupled to the best vacancy finding means, for receiving and storing said identifications of the preferred one or more vacancies and for outputting the stored identifications on a first-in first-out basis.

43. A machine system according to claim 42 wherein said tile moving means includes:

(b.2a) move request generating means for generating move requests that request a move of a given tile to a given vacancy; and (b.2b) request sorting means for sorting generated move requests according to access-wise adjacent source tiles or access-wise adjacent destination vacancies.

44. A machine system according to claim 43 wherein said tile moving means includes:

(b.2c) a move buffer for sequentially receiving access-wise adjacent plurality of tiles, for storing the received tiles, and for sequentially outputting data to access-wise adjacent destination vacancies.

45. A machine system according to claim 41 wherein said primary storage includes a nonvolatile memory device selected from the group consisting of:

magnetic disk, writable-optical disk, flash EEPROM, EEPROM, and magnetic bubble memory.

46. A machine system according to claim 45 wherein said primary storage includes a magnetic hard disk.

47. An instructing apparatus for instructing a target data processing system to re-organize storage locations for data stored in a re-organizable storage means, where the storage means has addressable storage sub-areas each for storing a predefined maximum amount of data, and where the storage means includes a directory structure for defining files of the storage means each as data contained in a respective directory-specified organization of said storage sub-areas and for further defining vacancy spaces each as provided by a respective directory-specified organization of said storage sub-areas, said instructing apparatus providing instructions for causing said target data processing system to perform the steps of:

(a) subdividing the data of the re-organizable storage means into tiles, each tile corresponding to one or more access-wise adjacent storage sub-areas;

(b) recognizing as a definition of a goal state, pre-recorded indications of goal locations for tiles in the re-organizable storage space;

(c) identifying an already-existing vacancy space within the re-organizable storage means; and (d) opportunistically pulling into the identified vacancy space the data of one or more source tiles that have that identified vacancy space defined by the recognized goal state as the goal location for the moved one or more source tiles.

48. An instructing apparatus according to claim 47 wherein said storage means includes a nonvolatile memory device selected from the group consisting of:

magnetic disk, writable-optical disk, flash EEPROM, EEPROM, and magnetic bubble memory.

49. An instructing apparatus according to claim 47 further providing instructions for causing said target data processing system to perform the step of:

(e) in a case where prior to the execution of said step (d) of opportunistically pulling it is determined that there is no already-existing vacancy space within the re-organizable storage mean, creating such a vacancy space and identifying the created vacancy space for use by said step (d) of opportunistically pulling.

50. An instructing apparatus according to claim 47 wherein said storage means includes a directory structure that defines logical linkages of said sub-areas as respective files or free spaces and wherein the instructing apparatus further provides instructions for causing said target data processing system to perform the step of:

(e) limiting said opportunistic pulling of tiles to tiles associated with pre-identified files.

51. An instructing apparatus according to claim 50 further providing instructions for causing said target data processing system to perform the step of:

(f) updating the directory structure to define the logical linkages of sub-areas for a given file after the goal state for that given file is reached by said opportunistic pulling of tiles.

52. An instructing apparatus according to claim 50 further providing instructions for causing said target data processing system to perform the step of:

(f) updating the directory structure to define the logical linkages of sub-areas for remaining free spaces after the goal state for said pre-identified files is reached by said opportunistic pulling of tiles.

53. An instructing apparatus according to claim 47 wherein each tile corresponds to one storage sub-area.

54. An instructing apparatus according to claim 47 wherein said storage means includes a directory structure that defines logical linkages of said sub-areas as respective files or free spaces and wherein the instructing apparatus further provides instructions for causing said target data processing system to perform the step of:

(e) generating and recording indications of goal locations for tiles so as to define a goal state that defragments one or more of said files.

55. An instructing apparatus according to claim 47 wherein said storage means includes a directory structure that defines logical linkages of said sub-areas as respective files or free spaces and wherein the instructing apparatus further provides instructions for causing said target data processing system to perform the step of:

(e) generating and recording indications of goal locations for tiles so as to define a goal state that places pre-identified ones of said files in an access-wise fastest portion of said storage means.

56. An instructing apparatus according to claim 47 wherein said storage means includes a directory structure that defines logical linkages of said sub-areas as respective files or free spaces and wherein the instructing apparatus further provides instructions for causing said target data processing system to perform the step of:

(e) generating and recording indications of goal locations for tiles so as to define a goal state that leaves a pre-identified subset of said files in their original organization within said storage means.

* * * * *